United States Patent
Waterman

(10) Patent No.: US 11,145,029 B2
(45) Date of Patent: Oct. 12, 2021

(54) AUTOMATED REGENERATION OF LOW QUALITY CONTENT TO HIGH QUALITY CONTENT

(71) Applicant: Rovi Guides, Inc., San Jose, CA (US)

(72) Inventor: Alan Waterman, Merced, CA (US)

(73) Assignee: Rovi Guides, Inc., San Jose, CA (US)

( * ) Notice: Subject to any disclaimer, the term of this patent is extended or adjusted under 35 U.S.C. 154(b) by 133 days.

(21) Appl. No.: 16/522,332

(22) Filed: Jul. 25, 2019

(65) Prior Publication Data

US 2021/0027427 A1      Jan. 28, 2021

(51) Int. Cl.
| | |
|---|---|
| *G06T 3/40* | (2006.01) |
| *G06N 3/08* | (2006.01) |
| *G06T 5/50* | (2006.01) |
| *G06T 15/20* | (2011.01) |

(52) U.S. Cl.
CPC ............ *G06T 3/4076* (2013.01); *G06N 3/08* (2013.01); *G06T 5/50* (2013.01); *G06T 15/205* (2013.01); *G06T 2207/20084* (2013.01)

(58) Field of Classification Search
CPC ....... G06T 3/4076; G06T 5/50; G06T 15/205; G06T 2207/20084; G06N 3/08
See application file for complete search history.

(56) References Cited

U.S. PATENT DOCUMENTS

| | | | |
|---|---|---|---|
| 6,100,881 | A | 8/2000 | Gibbons |
| 6,289,165 | B1 | 9/2001 | Abecassis |
| 7,756,945 | B1 | 7/2010 | Andreessen et al. |
| 8,578,416 | B1 | 11/2013 | Radloff et al. |

(Continued)

FOREIGN PATENT DOCUMENTS

| | | | | |
|---|---|---|---|---|
| CN | 106530227 A | * | 3/2017 | ............... G06T 3/40 |
| JP | 2005522108 | * | 7/2005 | ............. H04N 1/387 |
| JP | 2008539379 | * | 4/2006 | ............. G06T 11/60 |

OTHER PUBLICATIONS

Po et al., "Automatic 2D-to-3D video conversion technique based on depth-from-motion and color segmentation," IEEE10th International Conference, Oct. 24-28, 2010 https://ieeexplore.ieee.org/abstract/document/5655850, 4 pgs.

(Continued)

*Primary Examiner* — Sumati Lefkowitz
*Assistant Examiner* — Dalen O Goodson
(74) *Attorney, Agent, or Firm* — Haley Guiliano LLP

(57) ABSTRACT

A system accesses content structure that includes a first attribute table including a first list of attributes of a first object, and a first mapping including first attribute values. The first list of attributes of the first object also includes a quality attribute indicating a first quality. After a request to modify quality is received, the system searches a plurality of content structures for a suitable second content structure that comprises a second attribute table including a second list of attributes of a second object. The suitable content structure has another attribute that matches a corresponding attribute of the first list of attributes of the first object and a quality attribute indicating a second quality. The system modifies the first attribute table to include the second list of attributes of the second object. In this way content is generated that is of higher or lower quality than the original content.

20 Claims, 8 Drawing Sheets
(1 of 8 Drawing Sheet(s) Filed in Color)

(56) References Cited

U.S. PATENT DOCUMENTS

| | | | |
|---|---|---|---|
| 8,937,620 | B1 | 1/2015 | Teller |
| 9,106,812 | B1 | 8/2015 | Price |
| 9,671,940 | B1 | 6/2017 | Malik et al. |
| 10,074,200 | B1 | 9/2018 | Yeturu |
| 10,665,030 | B1 | 5/2020 | Shekhar |
| 10,685,059 | B2 | 6/2020 | Kim et al. |
| 2003/0105750 | A1* | 6/2003 | Chaboche ............ G06F 16/9038 |
| 2004/0004665 | A1 | 1/2004 | Kashiwa |
| 2006/0194181 | A1 | 8/2006 | Rosenberg |
| 2007/0147654 | A1 | 6/2007 | Clatworthy |
| 2007/0296723 | A1 | 12/2007 | Williams |
| 2007/0300157 | A1 | 12/2007 | Clausi et al. |
| 2009/0210395 | A1 | 8/2009 | Sedam |
| 2009/0240727 | A1* | 9/2009 | Sheehan ............... G06F 16/252 |
| 2010/0050083 | A1 | 2/2010 | Axen |
| 2010/0150526 | A1 | 6/2010 | Rose et al. |
| 2011/0106656 | A1 | 5/2011 | Schieffelin |
| 2011/0239119 | A1 | 9/2011 | Phillips |
| 2012/0005616 | A1 | 1/2012 | Walsh et al. |
| 2013/0080881 | A1 | 3/2013 | Goodspeed |
| 2014/0164593 | A1 | 6/2014 | Murray et al. |
| 2015/0011298 | A1 | 1/2015 | Haid et al. |
| 2015/0016714 | A1 | 1/2015 | Chui |
| 2015/0154192 | A1* | 6/2015 | Lysne .................... G06F 17/16 707/748 |
| 2015/0269441 | A1 | 9/2015 | Mj |
| 2016/0110612 | A1 | 4/2016 | Sabripour et al. |
| 2017/0011280 | A1* | 1/2017 | Soldevila ............. G06K 9/6214 |
| 2017/0025152 | A1 | 1/2017 | Jaime et al. |
| 2017/0097969 | A1 | 4/2017 | Stein et al. |
| 2017/0098152 | A1 | 4/2017 | Kerr et al. |
| 2017/0300748 | A1 | 10/2017 | Austin |
| 2017/0315966 | A1 | 11/2017 | Iyer |
| 2018/0107638 | A1 | 4/2018 | Ekambaram |
| 2018/0176661 | A1 | 6/2018 | Varndell et al. |
| 2018/0308523 | A1 | 10/2018 | Silvestri et al. |
| 2018/0356967 | A1 | 12/2018 | Rasheed |
| 2019/0155955 | A1 | 5/2019 | Castaneda et al. |
| 2019/0267041 | A1 | 8/2019 | Ricciardi |
| 2020/0098283 | A1 | 3/2020 | Vaculin |
| 2021/0019368 | A1 | 1/2021 | Ahamed et al. |
| 2021/0117409 | A1 | 4/2021 | O'Connor et al. |

OTHER PUBLICATIONS

PCT Search Report and Written Opinion in PCT/US2020/041121 dated Oct. 16, 2020.

Florescu, D., et al., ""Storing and Querying XML Data using an RDMBS"", "Quarterly Bulletin of the Computer Society of the IEEE Technical Committee on Data Engineering", Sep. 1, 1999, pp. 27-34.

Luebke, David, ""A Developer's Survey of Polygonal Simplification Algorithms"", "IEEE Computer Graphics and Applications", Aug. 7, 2002, pp. 24-35.

Turk, Greg, ""Re-Tiling Polygonal Surfaces"", "Computer Graphics and Interactive Techniques", Jul. 1, 1992, pp. 55-64.

PCT International Search Report and Written Opinion for International Application No. PCT/US2020/020075, dated Jun. 22, 2020 (14 pages).

Tsaftaris et al., "Colorizing a Masterpiece" IEEE Signal Processing Magazine, May 2011, 7 pgs.

* cited by examiner

300 content_structure_ID = CS133
    attribute_table_ID= AT131
        object_data_structure _ID =ODS134
            description_structure_ ID = DS135
                object_ID=111
                      object_type=human
                      object_resolution = 25LP/mm
                      object_coloration=B&W
                      object_feature_0=male
                      object_feature_1=40_Years
                      object_feature_2 =blue_jeans
                      object_feature_3 =brown_wavy_hair
                      object_feature_4 =latino
                      object_feature_5 =5'11"

Fig. 3

400 content_structure_ID=CS133
    mapping_ID=M132
        temporal resolution=30 fps
            for (object_ID = 111, 00:00-00:11 )
                object_state = [0,00:00 - 00:02, 27], [1,00:02 - 00:05, 35], [2,00:05-00:07,99], [3, 00:05 - 00:08,35], [4,00:07-00:08, 78], [5,00:08-00:11,45]
                absolute_location = [00:00-00:02,(11.34, 23.34, 23.87)], [00:02-00:07, (12.02, 21.23, 05.67)], [00:07-00:11, (12.10, 11.13, 05.45)]
                relative_location=[112, 00:00-00:02, (2.7,30°)], [113, 00:02-00:07,(12.7, 47°)], [114,00:07-00:11, (11.13, 132°)]

Fig. 4

AUTOMATED REGENERATION OF LOW QUALITY CONTENT TO HIGH QUALITY CONTENT

BACKGROUND

The present disclosure is directed to techniques for modify quality of a content segment, and in particular improving or lowering quality of a content segment by leveraging a database of existing content structures that encode large amounts of existing content segments.

SUMMARY

It is expensive and time-consuming to modify (e.g., improve or decrease) quality (e.g., resolution or coloration) of existing content segments using conventional computer platforms for content modeling and rendering. It is particularly expensive and time-consuming to improve the quality of content using conventional video editing techniques, such as manually stitching together clips from multiple sources and performing Computer Generated (CG) manipulation, including overlaying or inserting specific objects, characters, or effects into pre-existing video frames. For example, one approach to improving low resolution content involves an artist manually touching up frames of a content segment. However, such an approach is time-consuming and is not scalable to large projects.

To overcome these problems, techniques are disclosed herein for automatic adjustment of the quality of content segments (or of some objects within a content segment) by leveraging a system for storing, modifying, and rendering content structures that were created by breaking down content into granular components (attribute tables) that include objects, persons, actions, scenes, lighting, audio, etc., and corresponding mappings describing the values attributed to the attributes. Generation and modification of exemplary content structures that can be used for generating new content structures and rendered content structures into a content segment are described in co-pending application Ser. No. 16/451,823 (the '823 application hereinafter) entitled "SYSTEMS AND METHODS FOR CREATING CUSTOMIZED CONTENT," filed on Jun. 25, 2019, which is hereby expressly incorporated by reference herein in its entirety.

In particular, techniques described below may be used to increase or decrease quality of an object within content segment. A quality adjustment engine may access a stored first content structure. In some embodiments, the first content structure may have been generated based on a certain content segment using a deconstruction engine as described in the '823 application. The accessed content structure may comprise a first attribute table including a first list of attributes of a first object, and a first mapping including first attribute values corresponding to the first list of attributes. The first list of attributes of the first object may also comprise a quality attribute indicating a first quality (e.g., lower quality). For example, the low quality attribute may indicate that the object has a low vector density (e.g., a vector density below a threshold). In another example, the low quality attribute may indicate that the object has low spatial resolution (spatial resolution below a threshold) or low temporal resolution (temporal resolution below a threshold). In yet another example, the low quality attribute may indicate that the object has black and white coloration or a number of colors that is below a threshold.

Once a request (e.g., a user request) to modify the quality attribute (e.g., to indicate higher quality) is received, a quality adjustment engine may perform the steps described herein to achieve an modification in quality for the object of the first content structure. In one implementation, the quality adjustment engine may search a plurality of content structures (e.g., a database of content structures) for a second content structure that comprises a second attribute table that including a suitable second list of attributes of a second object. In particular, the second list of attributes of a second object may be determined to be suitable if it (a) comprises another attribute that matches a corresponding attribute of the first list of attributes of the first object, and (b) comprises a quality attribute indicating a second quality (e.g., higher quality).

For example, the higher quality attribute may indicate that the object has a higher vector density (e.g., a vector density above a threshold). In another example, the higher quality attribute may indicate that the object has higher spatial resolution (higher resolution below a threshold), higher temporal resolution (temporal resolution above a threshold). In yet another example, the higher quality attribute may indicate that the object has a number of colors that is above a threshold.

In some embodiments, the second list of attributes of a second object may be determined to be suitable only if a sufficient number (or all) of the attributes of the second list of attributes of a second object match respective attributes of a first object. In some embodiments, the second list of attributes of a second object may be determined to be suitable only if a key attribute of the second list of attributes of a second object matches the respective key attribute of the first object. For, example, the quality adjustment engine may check if the outline created by a vectorized representation of the first object matches the outline created by a vectorized representation of the second object.

Once the quality adjustment engine identifies a suitable second content structure, the quality adjustment engine modifies the first attribute table of the first content structure to include the second list of attributes of the second object. In some embodiments, the quality adjustment engine also modifies the first attribute table of the first content structure to exclude the first list of attributes of the first object. In this way, the first content structure automatically acquires an object description that provides for a different quality (e.g., higher quality) rendering of the first object (e.g., by proving higher quality vectorization).

Once the first attribute table of the first content structure is modified, a construction engine (as described in the '823 application) may be used to generate for output a content segment based on the first content structure. In this way, a content segment is automatically modified to include an object rendered with a different quality (e.g., with more colors, with a higher vector density, with higher spatial and/or temporal resolution), without the need for manual retouching or CGI splicing. While increasing quality was discussed above, a similar techniques may be used to lower the quality as will be described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects and advantages of the disclosure will be apparent upon consideration of the following detailed description, taken in conjunction with the accompanying drawings, in which like reference characters refer to like parts throughout, and in which:

FIG. 3 shows another illustrative diagram of an exemplary content structure, in accordance with some embodiments of the disclosure;

FIG. 4 shows still another illustrative diagram of an exemplary content structure, in accordance with some embodiments of the disclosure;

DETAILED DESCRIPTION

Figure 1:
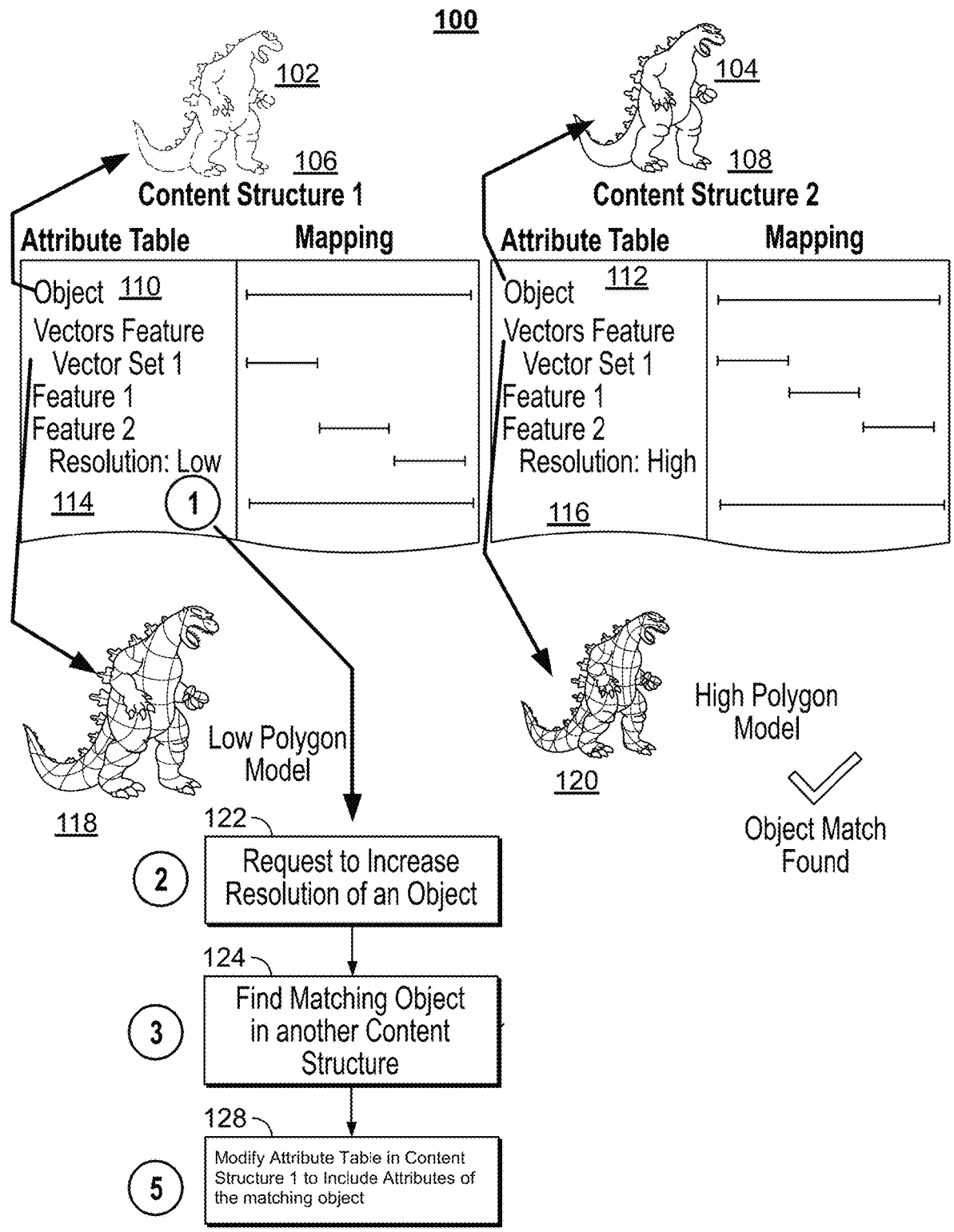
FIG. 1 shows an illustrative example for modifying quality of an object in a content structure.

FIG. 1 shows an illustrative example 100 for modifying quality (e.g., improving vector density) of an object in a content structure. In some embodiments, FIG. 1 depicts first content structure 106. The content structure may encode a content segment (e.g., a video) that includes depiction of monster 102 (e.g., as shown in FIG. 13B of the '823 application). In some embodiments, first content structure 106 may have been created using the deconstruction engine described in the '823 application.

First content structure 106 may include an attribute table that encodes all objects of a content segment. For example, first content structure 106 includes object 110, which encodes attributes of the monster. Content structure 106 may also include objects (not shown) that encode other objects (e.g., bridge, sky, water, and other objects shown in FIG. 13B of the '823 application). Each object may have a set of attributes, each attribute being associated with a mapping as described in the '823 application. When content structure 106 is rendered by a construction engine (as described in the '823 application), a content segment depicted in FIG. 13B of the '823 application may be generated as a result.

As shown, object 110 includes a set of attributes encoding visual (and/or audio) depiction of monster 102. In some embodiments, attributes may include a type of monster, color, fire-breathing ability, eye color, size, relative position, global position movement, etc., e.g., as showing in FIG. 12 of the '823 application. In some embodiments, object 110 may include a vector attribute that includes vector set 118, which defines dimensions and appearance of monster 102. Vector set 118 may have a low vector density (e.g., it may be a "low poly" vector set). For example, an object with less than 1000 polygons may be considered to have a low vector density. In another example, an object with less density than 1000 polygons per square inch may be considered to have low vector density. As shown, object 110 may also include quality attribute 114 indicating the low quality of object 110. As shown, attribute 114 simply indicates that the type is "low," however, attribute 114 may have a numerical value (e.g., a value tracking the number of vectors or density of vectors.) Because vector set 118 has low polygon density, when object 110 is rendered by a construction engine, the resulting monster 102 may appear in low resolution.

In some embodiments, the quality adjustment engine may receive a request 122 to increase resolution of object 110. For example, the request may be received from a user. In some embodiments, the request may be received from a construction engine that seeks to show a content segment in higher quality (e.g., when presenting the content segment on a larger screen).

Once the request is received, the quality adjustment engine may search 124 a database of content structures for a second content structure that may encode a second object that may be substituted for object 110. In particular, the quality adjustment engine may search for second content structure 108, which comprises a second attribute table including a second list of attributes of a second object 112 that (a) comprises a quality attribute indicating higher quality, and (b) comprises another attribute that matches a corresponding attribute of the first list of attributes of the first object.

For example, the quality adjustment engine may determine that content structure 108 is suitable due to attributes 1 and 2 (or another set of attributes) of content structure 108 matching corresponding attributes 1 and 2 (or another set of attributes) of content structure 106. For example, object 112 may be the encoding of monster 104 and include attributes like type of monster, color, fire-breathing ability, eye color, size, relative position, global position movement, etc., which match the corresponding attributes of object 110. In some embodiments, a threshold number of attributes must match (e.g., 95% of attributes). In some embodiments, a key attribute must match (e.g., the vector attribute, as will be explained below).

In addition, for the quality adjustment engine to find a match, object 112 may need to include a quality attribute indicating higher quality. For example, object 112 may include an attribute indicating "high" resolution 116 as shown. In some embodiments, object 112 may include an attribute indicating the vector count or vector density of vector set 120. For example, a vector count of over 1000 polygons may be considered be indicative of high quality. In another example, a vector density of more than 1000 polygons per square inch may be considered to have high quality. In the shown example, vector set 120 may have a high vector density. Consequently, if object 112 were rendered by construction engine, monster 104 would be rendered in high resolution.

In some embodiments, the quality adjustment engine may check whether the outline created by vector set 120 matches an outline created by vector set 118. Any suitable graphic comparison techniques may be used to perform this check. In some embodiments, the vector attribute of object 122 may be determined to match the vector attribute of object 110 only when their respective outlines match. Such a match may insure that object 112 may be smoothly overlaid over object 110. In some embodiments, vector sets may be a key attribute match that ensures overall suitability of content structure 108.

At 124, the quality adjustment engine may determine that object 112 is suitable, based on the criteria described above (e.g., presence of high quality attributes and attribute matches). Consequently, the quality adjustment engine modifies 128 the first attribute table of first content structure 106 to include the second list of attributes of object 112. In addition, the quality adjustment engine may modify the first attribute table of the first content structure to exclude the first list of attributes of the first object. Alternatively, the quality adjustment engine may simply replace object 110 in content structure 106 with object 112 from suitable content structure 108. Beneficially, content structure 106 now contains an object with improved quality (e.g., higher vector count) without the need for manual retouching or CGI work. Later, a construction engine may be used to render content structure 106 into a content segment that may be presented on user equipment as described in the '823 application.

In some embodiments, the quality adjustment engine may further improve vector set 118 or 120 by using a neural net. In some embodiments, a neural net may accept a low polygon model and output a figure with a higher vector count. The techniques for training and using such a neural net will be describe below with relation to FIG. 9. Once a neural net is used, the quality adjustment engine may store the output of the neural net as new vector set 118 or new vector set 120.

While FIG. 1 is described to improving quality of object 110, one skilled in the art would understand that a similar technique may be used to lower quality of object 110. For example, resolution 114 may start out indicating higher resolution, and a request 122 may be a request to decrease resolution. In such embodiments, quality adjustment engine may look for matching structure 108 in a similar way describe in relation to step 124 except that it may search for resolution attribute 116 indicating lower quality.

Figure 2:
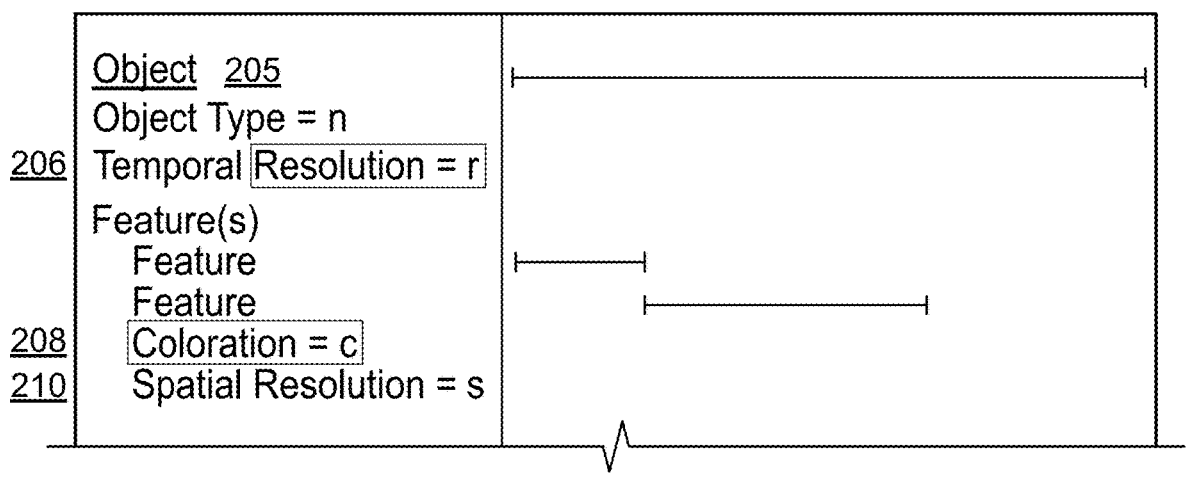
FIG. 2 shows an illustrative diagram of an exemplary content structure, in accordance with some embodiments of the disclosure.

FIGS. 2-4 show several illustrative diagrams of exemplary content structures that include different types of quality attributes that may be used by methods described in this disclosure. The quality adjustment engine may access content structure 200 which includes an attribute table 202 and mapping 204. Specifically, attribute table 202 may include object data structure 205 including attributes relating to an object (e.g., to object 110 of FIG. 1). The object data structure 205 includes attribute table entries such as a descriptive structure, object type, action structure, audio structure, etc. Attribute table entries may be state attributes, action attributes, relative motion attributes, absolute motion attributes. Each attribute may be mapping in mapping table 204. Exemplary attributes and associated mappings mapped are described further in the '823 application.

In addition, object 205 may include a temporal resolution attribute 206. The temporal resolution may define frame per second rate (fps rate) at which object 205 would be rendered. In some embodiments, a temporal resolution of lower than 15 fps may be considered to be a lower quality resolution, while a temporal resolution equal to or higher than 15 fps may be considered to be a higher quality resolution.

In some embodiments, some or all attributes may include coloration attribute 208. For example, the coloration attribute may indicate whether object 205 or an attribute of the object is black and white or colored. In some embodiments, black and white may be considered to be low quality coloration. In some embodiments, a number of colors less than $16^3$ may be considered to be low quality coloration. In some embodiments, a number of colors equal to or greater than $16^3$ may be considered to be a higher quality coloration.

In some embodiments, some or all attributes may include spatial resolution attribute 210. For example, the coloration attribute may indicate the number or lines or pixels per area for object 205. In some embodiments, a number of lines less than 5 per mm may be considered to be a low quality spatial resolution. In some embodiments, a number of lines greater than 5 per mm may be considered to be a higher quality spatial resolution.

FIG. 3 shows a part of content structure 300. As shown, content structure 300 may have ID "CS133." Content structure 300 may have table ID "AT131," structure ID "DS135," and object ID "111." The object with ID "111" may have multiple attributes: e.g., type "human," "male," "40 years old," "blue jeans," "brown wavy hair," "Latino," and height "5'11"."

In addition, the object with ID "111" may have a resolution attribute that is equal to "25LP/mm" (indicating 25 lines per millimeter) and coloration attribute "B&W" (indicating black and white colors.) These attributes may be used by the quality adjustment engine to improve objects as described above and below. For example, the object resolution and coloration attributes may be used to check if the object with ID "111" has higher quality or lower quality. Other attributes may be used for attribute matching.

FIG. 4 shows a part of content structure 400. As shown, content structure 400 may have ID "CS133," and mapping ID "M132." As shown, content structure 400 has attribute "temporal resolution" that is equal to "30 FPS" (30 frames per second.) This attribute may be associated object with the object labeled "111" (e.g., object described in FIG. 3) at several time periods as defined by mappings for object state, absolute location, and relative location. The time periods defined for the object with label "111" may be associated with 30 fps temporal resolution. These attributes may be used by the quality adjustment engine to improve objects as described above and below. For example, temporal resolution may be used to check if the object with ID "111" has a higher quality or lower quality.

Figure 5:
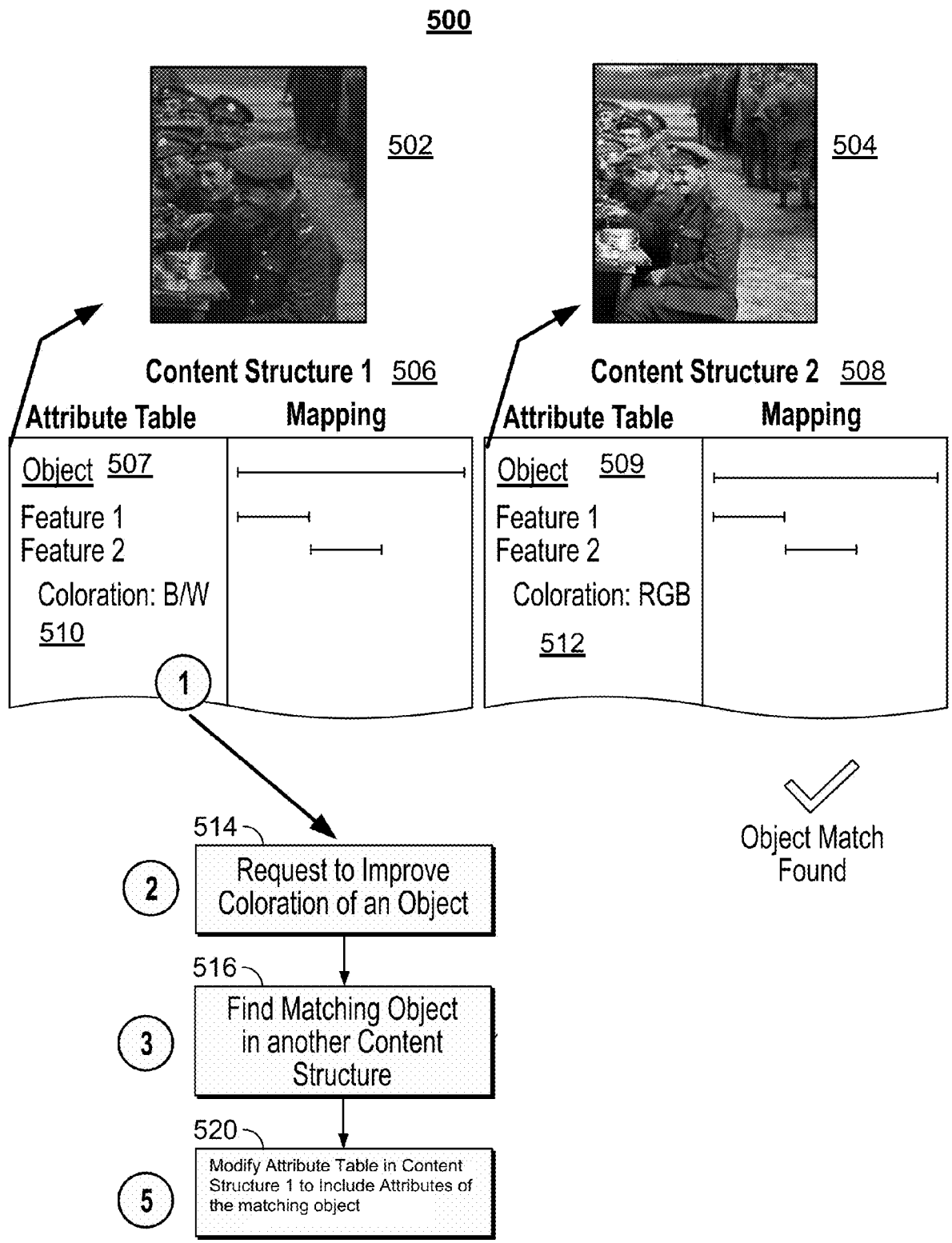
FIG. 5 shows an illustrative example for modifying the quality of an object in a content structure.

FIG. 5 shows another illustrative example 500 for modifying quality (e.g., improving coloration) of an object in a content structure. In some embodiments, FIG. 5 depicts first content structure 506. The content structure may encode a content segment (e.g., a video) that includes depiction of WW1 soldiers 502. In some embodiments, first content structure 506 may have been created using the deconstruction engine described in the '823 application.

First content structure 506 may include an attribute table that encodes all objects of a content segment. For example, first content structure 506 includes object 507, which encodes attributes of a first soldier. Content structure 506 may also encode other objects (not shown) (e.g., other soldiers, tables, plates, spoons, earth, sky, etc.). Each object may have a set of attributes, each attribute being associated with a mapping as described in the '823 application. When content structure 106 is rendered by a construction engine (as described in the '823 application), a content segment application may be produced as a result (the content segment may include frame 502).

As shown, object 507 includes a set of attributes encoding visual (and/or audio) depiction of one of the soldiers in frame 502. In some embodiments, attributes may include an object type (e.g., human), gender, age, clothing, hair color, eye color, complexion, and height (e.g., as shown in FIG. 3). In some embodiments, object 507 may include a color attribute 510 that indicates that object 507 is rendered in black and white (which is considered a low quality coloration). Because color attribute 510 indicates black and white coloration, when object 507 is rendered by a construction engine, the resulting soldiers 502 may appear in black and white.

In some embodiments, the quality adjustment engine may receive a request 514 to increase coloration of object 507. For example, the request may be received from a user. In some embodiments, the request may be received from a construction engine that seeks to show a content segment in higher quality (e.g., when presenting the content segment on a larger screen).

Once the request is received, the quality adjustment engine may search 516 a database of content structures for a second content structure that may encode an object that may be substituted for object 507. In particular, the quality adjustment engine may search for second content structure 508 that comprises a second attribute table including a second list of attributes of a second object 509 that (a) comprises a quality attribute indicating higher quality, and (b) comprises another attribute that matches a corresponding attribute of the first list of attributes of the first object.

For example, the quality adjustment engine may determine that content structure 508 is suitable due to the attributes of object 509 (e.g., object type, gender, age, clothing, hair color, eye color, complexion, and height) matching the corresponding attributes of content structure 506. In some embodiments, a threshold number of attributes must match (e.g., 95% of attributes).

In addition, for the quality adjustment engine to find a match, object 509 may need to include a quality attribute indicating higher quality. For example, object 509 may include color attribute 512, which indicates RGB coloration of object 509. In some embodiments, color attribute 512 may indicate number of colors (e.g., 16^3 or 255^3). In some embodiments, any number of colors greater than 16^3 may be considered to be a "higher quality" coloration. Consequently, if object 509 were rendered by a construction engine, soldiers 504 would be rendered in color.

At 516, the quality adjustment engine may determine that object 509 is suitable, based on the criteria described above (e.g., presence of a high quality attribute and an attribute match). Consequently, the quality adjustment engine modifies 520 the first attribute table of first content structure 506 to include the second list of attributes of the object 509 (or to include object 509). In addition, the quality adjustment engine may modify the first attribute table of the first content structure to exclude the first list of attributes of the first object (or to remove object 507). As a result, object 507 of content structure 506 is replaced with object 509 from suitable content structure 508. Beneficially, content structure 506 now contains an object with improved quality (e.g., higher color count) without the need for manual retouching or CGI work. Later, a construction engine may be used to render content structure 506 into a content segment that may be played on user equipment as described in the '823 application.

In some embodiments, the quality adjustment engine may similarly perform improvement to a content structure to enhance an object that has an attribute indicating low spatial resolution, or low temporal resolution. That is, the quality adjustment engine may search for suitable second content structure with matching attributes and a higher resolution attribute (e.g., better spatial resolution, or better temporal resolution). In some embodiments, the quality adjustment engine may improve multiple quality attributes at the same time (e.g., both temporal and spatial resolution).

In some embodiments, the quality adjustment engine may lower the quality of an object in the content structure instead of improving it. For example, this may be needed when a content segment needs to be transmitted over a low quality connection. In another example, this may be needed to create a content segment that has an historical or vintage aesthetic. In this implementation, the quality adjustment engine operates as described above; however, it starts with a content structure that has an attribute indicating higher quality and searches for a suitable matching content structure that has an attribute indicating lower quality. For example, this technique may be used to replace an object with another object that has a lower vector density, or to replace a colored object with black and white object.

For example, coloration 510 may start out indicating RGB coloration, and a request 514 may be a request to decrease coloration. In such embodiments, quality adjustment engine may look for matching structure 508 in a similar way describe in relation to step 516 except that it may search for coloration attribute 116 indicating black/white coloration.

Figure 6:
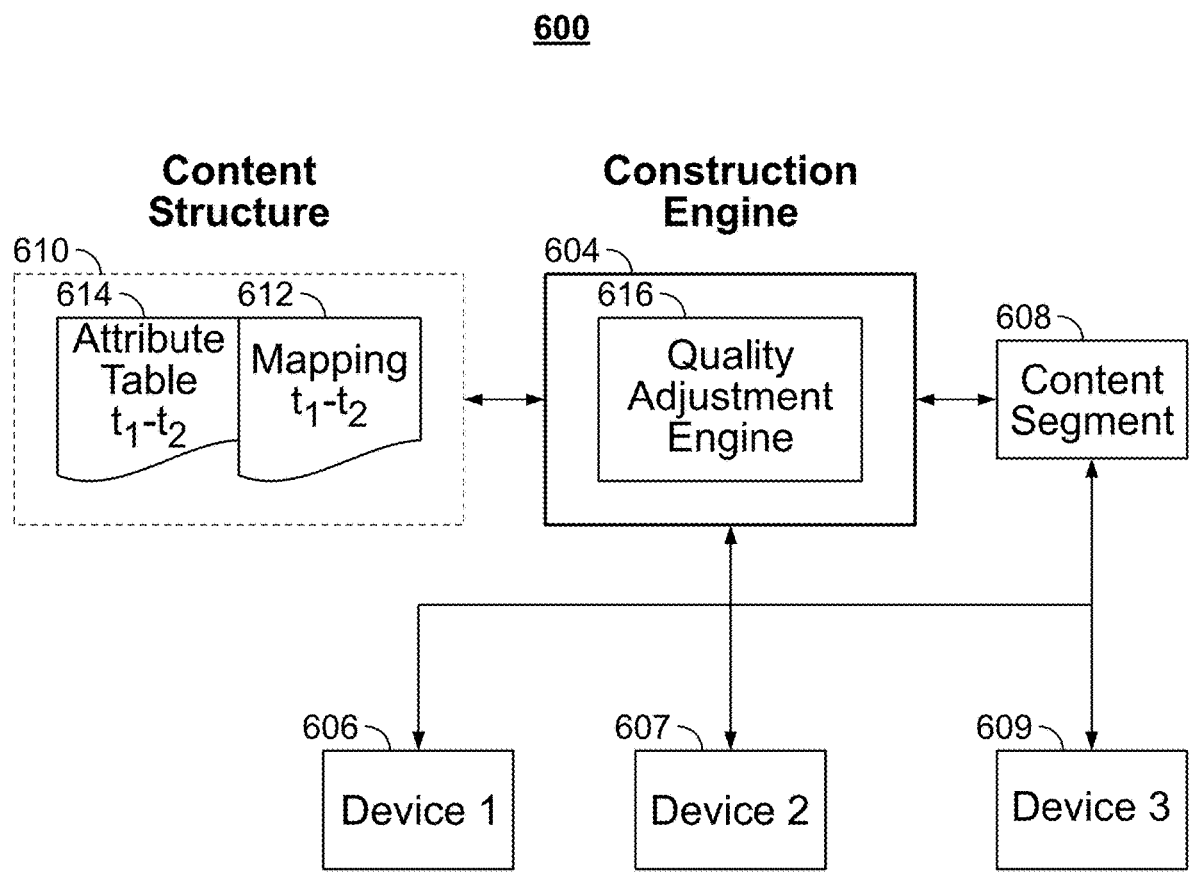
FIG. 6 shows an illustrative system diagram of the quality adjustment engine, the content structure, the construction engine, the content segment, and devices, in accordance with some embodiments of the disclosure.
Figure 7:
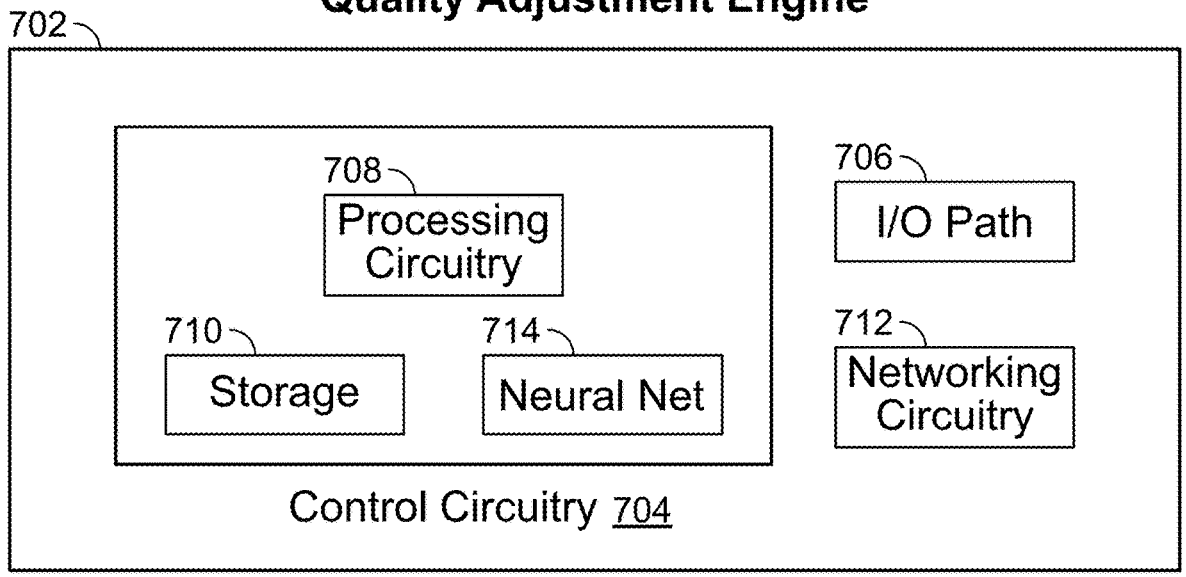
FIG. 7 shows an illustrative block diagram of the quality adjustment engine, in accordance with some embodiments of the disclosure.
Figure 8:
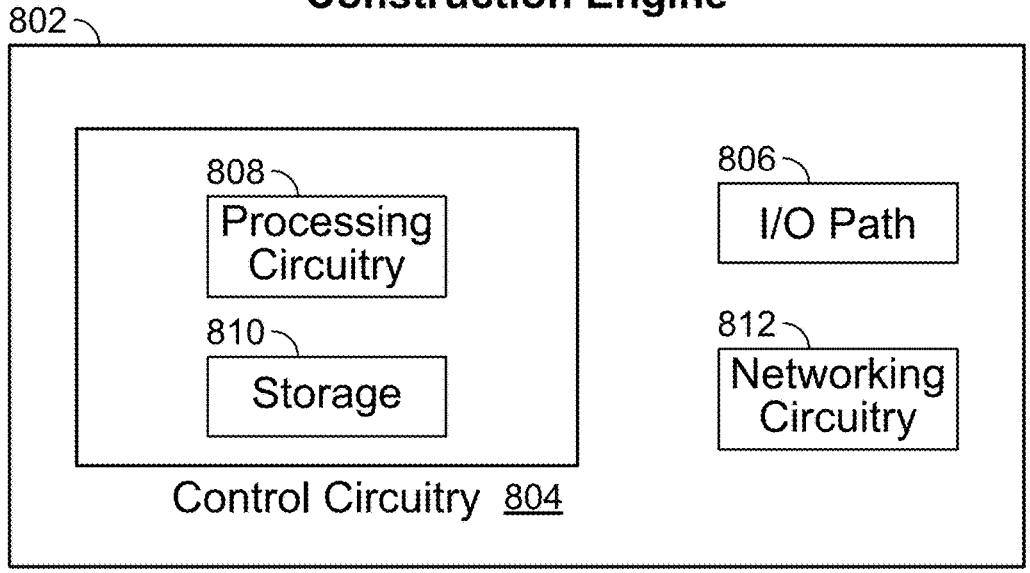
FIG. 8 shows an illustrative block diagram of the construction engine, in accordance with some embodiments of the disclosure.

FIG. 6 shows an illustrative system diagram 600 of the quality adjustment engine, the content structure, the construction engine, the content segment, and devices, in accordance with some embodiments of the disclosure. The construction engine 604 may comprise any suitable hardware that provides for processing and transmit/receive functionality. Construction engine 604 may be communicatively coupled to multiple electronic devices (e.g., device 1 (606), device 2 (607), device n (609)). Construction engine 604 may be communicatively coupled to a content structure 610 and content segment 608. As shown, construction engine 604 may include quality adjustment engine 616. In some embodiments, quality adjustment engine 616 may be an independent device communicatively connected to construction engine 604. As illustrated within FIG. 6, a further detailed disclosure on the quality adjustment engine can be seen in FIG. 7 showing an illustrative block diagram of the quality adjustment engine, in accordance with some embodiments of the disclosure. Additionally, as illustrated within FIG. 6, a further detailed disclosure on the construction engine can be seen in FIG. 8 showing an illustrative block diagram of the construction engine, in accordance with some embodiments of the disclosure.

In some embodiments, the quality adjustment engine may be implemented remote from the devices 606-609 such as in a cloud server configuration. The quality adjustment engine may be any device for improving content structures stored on devices 606-609. The quality adjustment engine may be implemented by a television, a Smart TV, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. For example, any device that needs to improve a content segment prior to presentation may include a quality adjustment engine. Any of the system modules (e.g., quality adjustment engine, data structure, ISP, and electronic devices) may be any combination of shared or disparate hardware pieces that are communicatively coupled.

In some embodiments, the construction engine may be implemented remote from the electronic devices 606-609 such as in a cloud server configuration. The construction engine may be any device for accessing the content structure and generating content segments as described above. The construction may be implemented by hardware similar to hardware for implementing quality adjustment engine 616. Any of the system modules (e.g., quality adjustment engine, data structure, ISP, and electronic devices) may be any combination of shared or disparate hardware pieces that are communicatively coupled.

In some embodiments, quality adjustment engine 616, construction engine 604, and a device from devices 606-609 may be implemented within a single local device. In other embodiments, the quality adjustment engine and construction engine may be implemented within a single local device.

The electronic device (e.g., device 1 (606), device 2 (607), device n (609)) may be any device that has properties to transmit/receive network data as well as an interface to play back media content (e.g., touchscreen, speakers, keyboard, voice command input and confirmation, or any other similar interfaces). The devices 606-609 may be implemented using hardware similar to hardware of improvement agent 614.

Content structure 610 may be any database, server, or computing device that contains memory for receiving and transmitting data related to the attribute table 614 and mapping 612. Example data that may be stored in the content structure, as described earlier, can be seen in FIGS. 1 and 5. The content structure may be cloud based or integrated into the quality adjustment engine, construction engine, and/or one of the devices 606-609. In some embodiments, the content structure is communicatively coupled to both the quality adjustment engine 616 and the construction engine 604.

Content segment 608 may be any data or information that is generated by construction engine 604. The content segment may be transmitted by construction engine 604 to any of devices 606-609. Content segment may be communicatively coupled to the devices 606-609, construction engine 604, and quality adjustment engine 616. For example, when content segment 608 needs to be improved, this operation is performed by quality adjustment engine 616 and the modified content structure 610 is then rendered using construction engine 604.

FIG. 7 shows an illustrative block diagram 700 of the quality adjustment engine 702 (e.g., quality adjustment engine 616), in accordance with some embodiments of the disclosure. In some embodiments, the quality adjustment engine may be communicatively connected to a user interface and to networking circuitry 712 (e.g., for sending and receiving content structures). In some embodiments, the quality adjustment engine may include processing circuitry, control circuitry, and storage (e.g., RAM, ROM, hard disk, removable disk, etc.). The quality adjustment engine may include an input/output path 706. Input/output (I/O) path 706 may provide device information, or other data, over a local area network (LAN) or wide area network (WAN), and/or other content and data to control circuitry 704, that includes processing circuitry 708 and storage 710. Control circuitry 704 may be used to send and receive commands, requests, signals (digital and analog), and other suitable data using I/O path 706. I/O path 706 may connect control circuitry 704 (and specifically processing circuitry 708) to one or more communications paths.

Control circuitry 704 may be based on any suitable processing circuitry such as processing circuitry 708. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for quality adjustment engine 702 stored in memory (e.g., storage 710).

Memory may be an electronic storage device provided as storage 710 that is part of control circuitry 704. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions). In some embodiments, quality adjustment engine 702 also includes neural net 714 will be described in more detail below.

Quality adjustment engine 702 may be coupled to a communications network via network circuitry 712. The communications network may be one or more networks including the Internet, a mobile phone network, mobile voice or data network (e.g., a 5G, 4G or LTE network), mesh network, peer-to-peer network, cable network, or other type of communications network or combination of communications networks. The linguistics processing engine may be coupled to a secondary communications network (e.g., Bluetooth, Near Field Communication, service provider proprietary networks, or wired connection) to the selected device for generation of playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

FIG. 8 shows an illustrative block diagram 800 of the construction engine 802 (e.g., construction engine 604), in accordance with some embodiments of the disclosure. The construction engine may perform each of the operations individually or collaboratively. In some embodiments, the construction engine may be communicatively connected to a user interface. In some embodiments, the construction engine may include processing circuitry, control circuitry, and storage (e.g., RAM, ROM, hard disk, removable disk, etc.). The construction engine may include an input/output path 806. The construction engine may be coupled to a communications network via network circuitry 812. In some embodiments, construction engine 802 includes control circuitry 804 (e.g., similar to control circuitry 704). Control circuitry 804 may include processing circuitry 808 and storage 810 that are similar to processing circuitry 708 and storage 710, respectively.

Figure 9:
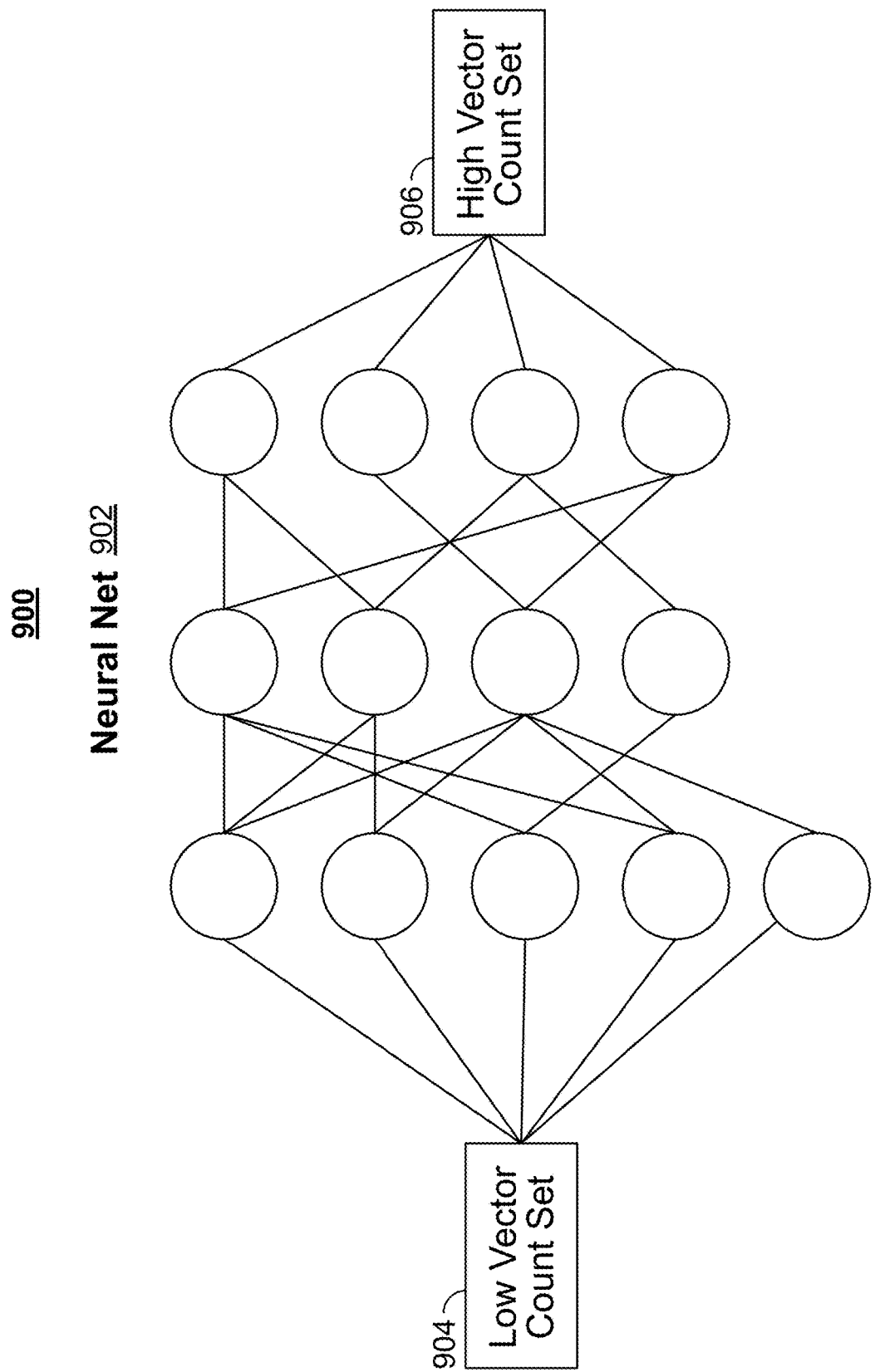
FIG. 9 shows an illustrative block diagram of a neural net, in accordance with some embodiments of the disclosure.

FIG. 9 is an illustrative block diagram 900 of neural net 902, in accordance with some embodiments of the disclosure. In some embodiments, neural net 902 may be neural net 714 of FIG. 7. In some embodiments, a quality adjustment engine (e.g., quality adjustment engine 702) may use neural net 902 to improve vector density (e.g., of vector set 118 or 120 of FIG. 1).

In some embodiments, neural net 902 may include multiple neurons (represented as circles in FIG. 9) and connections between neurons (represented as straight lines in FIG. 9). Each neuron may be a data structure with two states (e.g., {1} or {ON} state, and {0} or {OFF} state). Each neuron may have positive or negative connections to neurons of the previous layer and/or to neurons of the next layer. Each connection may be used to communicate the state of the neuron to other neurons. For example, the positive connection may send the state of the neuron, while the negative connection may send the inverse of the state of the neuron. The incoming connections may be used to set the state of the neuron. For example, if more {ON} signals are received than {OFF} signals, the neuron is set to the {ON} state. If more {OFF} signals are received than {ON} signals, the neuron is set to the {OFF} state. In some embodiments, neural net 902 may be fully connected and include a weight for each connection. In this case, neurons are set to incoming values based on weights of the connections. The connections may be added or removed as neural net 902 is trained (e.g., as explained below). The weights may be changed as neural net 902 is trained (e.g., as explained below).

To train the neural net, the quality adjustment engine may start with a high density vector set (a training set). Then, some of the vectors (e.g., 20% of random vectors) may be removed at random. The truncated training set is then inputted into neural net 902. The output of neural net 902 is compared to the initial (untruncated) training set. Connections and weights are then adjusted seeking to maximize the output of neural net 902 matching the untruncated initial training set. In this way, neural network 902 is trained to reconstruct fuller vector sets based on vector-poor vector sets. The training may be repeated multiple times and with multiple training vector sets truncated in different ways.

Once trained, the quality adjustment engine may use neural net 902 to increase the quality of the vector sets of objects in content structures. For example, the quality adjustment engine may input 904 a vector set (e.g., vector set 118) of an object into neural net 902 and receive 906 an improved, higher density vector set as an output of neural net 902. The improved vector set may then be stored as part of a content structure (e.g., content structure 106).

Figure 10:
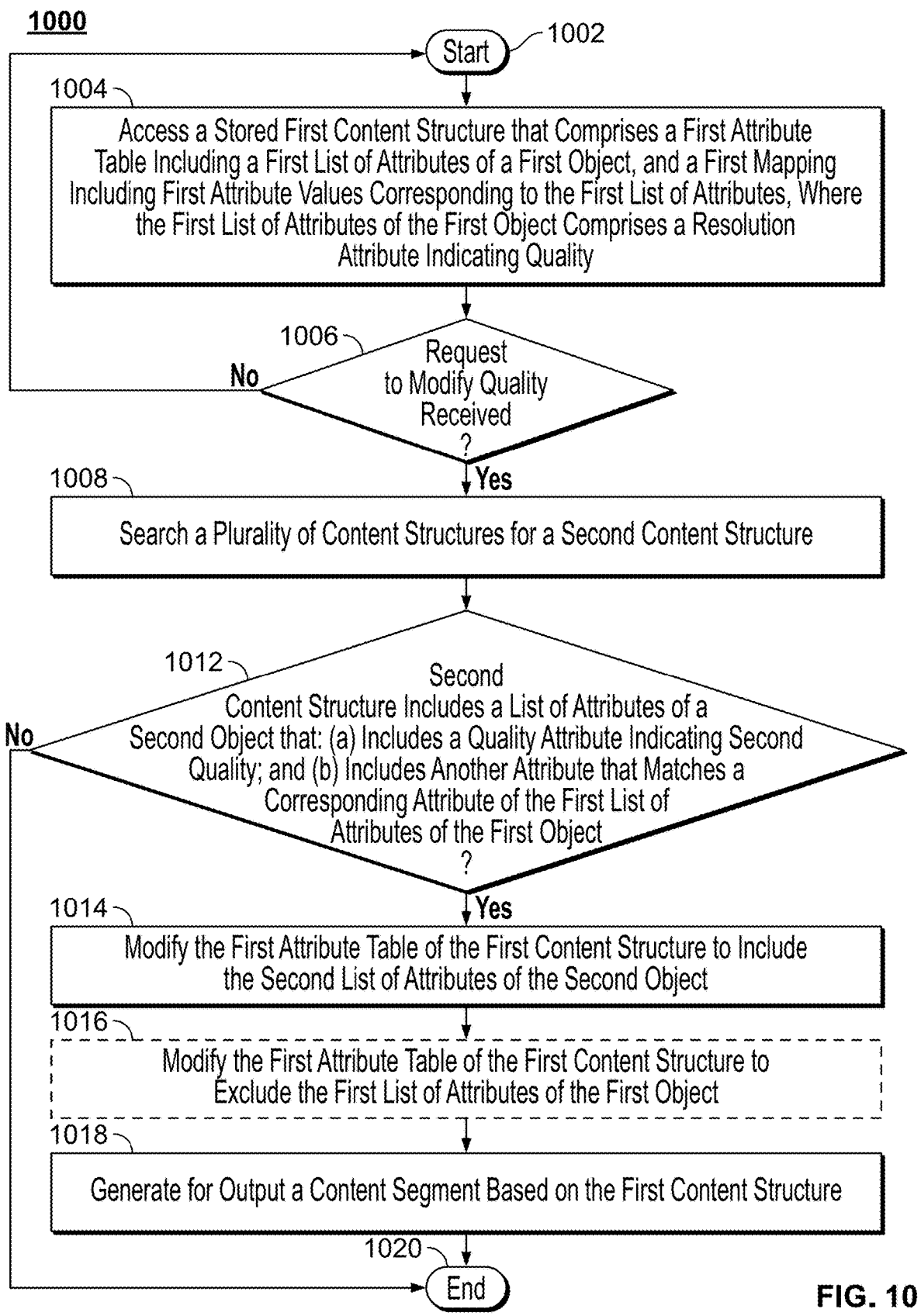
FIG. 10 shows an illustrative flowchart of a process for creating content based on one or more previously stored content structures, in accordance with some embodiments of the disclosure.

FIG. 10 is an illustrative flowchart of a process 1000 for creating content based on one or more previously stored content structures, in accordance with some embodiments of the disclosure. Process 1000, and any of the following processes, may be executed by one or more of control circuitry 704 (e.g., in a manner instructed to control circuitry 704 by the instructions stored on memory 710) and control circuitry 804 (e.g., in a manner instructed to control circuitry 804 by the instructions stored on memory 810). Control circuitry 704 may be part of a quality adjustment engine or of a remote server separated from the quality adjustment engine by way of a communications network or distributed over a combination of both.

Process 1000 begins at 1002. For example, process 1000 may be performed as a part of routine that is occasionally executed by a system 600. At 1004, a control circuitry (e.g., control circuitry 704) accesses a stored first content structure. For example, the first content structure may be stored as part of memory 710 or received from a deconstruction engine. The first content structure may include a first attribute table including a first list of attributes of a first object, and a first mapping including first attribute values corresponding to the first list of attributes (for example, as show in FIG. 1 with regard to content structure 106). The first list of attributes of the first object may also include a resolution attribute indicating first quality (e.g., lower quality or high quality). For example, the resolution attribute indicating lower quality may be an attribute indicating a low vector density, poor coloration, low spatial resolution, or low temporal resolution.

At 1006, the control circuitry may check if a request to adjust (e.g., improve or lower) the quality of the first content structure is received. For example, the request may be received from a user via user interface, or from a media delivery system that needs to deliver a higher or lower quality content segment. If no request is received, the quality adjustment engine returns to step 1002. If a request is received, the control circuitry proceeds to step 1008.

At 1008, the control circuitry may search a plurality of content structures for a second content structure that is suitable to improve or lower the quality of an object first content structure. For example, the control circuitry may search a local or cloud database of content structures for a suitable second content structure by checking if the second content structure includes an object with suitable attributes and quality.

In some embodiments, at 1012, the control circuitry checks whether the second content structure includes a list of attributes that (a) includes a quality attribute indicating the second quality (e.g., lower quality or higher quality), and (b) includes another attribute that matches a corresponding attribute of the first list of attributes of the first object. For example, the control circuitry may check if a threshold amount of attributes of a second object of the second content structure match the corresponding attributes of a first object of the first content structure. In another example, only a key attribute match is checked (e.g., outline of vector set). The control circuitry may also check if the second content structure includes an object that has a quality attribute indicating the second requested quality (e.g., better or worse coloration than the first object, better or worse vector density, better or worse spatial resolution, and/or better or worse temporal resolution). If all conditions are met, the control circuitry proceeds to 1014; otherwise, the control circuitry proceeds to 1020 where process 1000 ends.

At 1014, the control circuitry may modify the first attribute table of the first content structure to include the second list of attributes of the second object. In this way, the first content structure may acquire an object with attributes that ensure better or lower quality. In some embodiments, at 1016 (which is optional), the control circuitry may also modify the first attribute table of the first content structure to exclude the first list of attributes of the first object, since the first object is no longer necessary.

At 1018, a control circuitry (e.g., control circuitry 804 of construction engine 802) may generate for output a content segment based on the first content structure. For example, the content segment may be generated for showing on a screen of a user device, or for transmission via a network. The construction of a content segment based on a content structure is described in more detail in the '823 application.

It is contemplated that the steps or descriptions of FIG. 10 may be used with any other suitable embodiment of this disclosure. In addition, suitable steps and descriptions described in relation to FIG. 10 may be done in alternative orders or in parallel to further the purposes of this disclosure. For example, suitable steps may be performed in any order or in parallel or substantially simultaneously to reduce lag or increase the speed of the system or method. Some of the suitable steps may also be skipped or omitted from the process. Furthermore, it should be noted that any of the devices or equipment discussed in relation to FIGS. 6, 7 and 8 could be used to perform one or more of the steps in FIG. 10.

The processes discussed above are intended to be illustrative and not limiting. One skilled in the art would appreciate that any of the steps of the processes discussed herein may be omitted, modified, combined, and/or rearranged and any additional steps may be performed without departing from the scope of the invention. More generally, the above disclosure is meant to be exemplary and not limiting. Furthermore, it should be noted that the features and limitations described in any one embodiment may be applied to any other suitable embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for creating content based on one or more previously stored content structures, the method comprising:
    accessing a stored first content structure that comprises a first attribute table including a first list of attributes of a first object, and a first mapping including first attribute values corresponding to the first list of attributes, wherein the first list of attributes of the first object comprises a resolution attribute indicating a first quality;
    receiving a request to modify the attribute to indicate a second quality;
    searching a plurality of content structures for a second content structure that comprises a second attribute table including a second list of attributes of a second object, wherein the second list of attributes:
        (a) comprises a quality attribute indicating the second quality; and
        (b) comprises another attribute that matches a corresponding attribute of the first list of attributes of the first object;
    modifying the first attribute table of the first content structure to include the second list of attributes of the second object; and
    generating for output a content segment based on the first content structure.

2. The method of claim 1, further comprising:
    modifying the first attribute table of the first content structure to exclude the first list of attributes of the first object.

3. The method of claim 1, wherein the quality attribute is a vector density attribute.

4. The method of claim 3, wherein the attribute of the second list of attributes of the second object that matches the corresponding attribute of the first list of attributes of the first object is a vectorized representation of the second object.

5. The method of claim 4, wherein an outline created by the vectorized representation of the second object matches an outline created by a vectorized representation of the first object.

6. The method of claim 3, further comprising: modifying the vectorized representation of the second object to modify vector density.

7. The method of claim 6, wherein the modifying the vectorized representation of the second object to modify vector density comprises inputting the vectorized representation of the second object into a neural network configured to increase vector density.

8. The method of claim 1, wherein the quality attribute is at least one of: a spectral resolution attribute, a temporal resolution attribute, and a coloration attribute.

9. The method of claim 1, wherein the first quality is lower quality and the second quality is high quality.

10. The method of claim 1, wherein the first quality is high quality and the second quality is lower quality.

11. A system for creating content based on one or more previously stored content structures, the system comprising:
    control circuitry configured to:
        access a stored first content structure that comprises a first attribute table including a first list of attributes of a first object, and a first mapping including first attribute values corresponding to the first list of attributes, wherein the first list of attributes of the first object comprises a resolution attribute indicating a first quality;
        receive a request to modify the attribute to indicate a second quality;
        search a plurality of content structures for a second content structure that comprises a second attribute table including a second list of attributes of a second object, wherein the second list of attributes:
            (a) comprises a quality attribute indicating the second quality; and
            (b) comprises another attribute that matches a corresponding attribute of the first list of attributes of the first object;
        modify the first attribute table of the first content structure to include the second list of attributes of the second object; and
    a construction engine configured to:
        generate for output a content segment based on the first content structure.

12. The system of claim 11, wherein the control circuitry is configured to:
    modify the first attribute table of the first content structure to exclude the first list of attributes of the first object.

13. The system of claim 11, wherein the quality attribute is a vector density attribute.

14. The system of claim 13, wherein the attribute of the second list of attributes of the second object that matches the corresponding attribute of the first list of attributes of the first object is a vectorized representation of the second object.

15. The system of claim 14, wherein an outline created by the vectorized representation of the second object matches an outline created by a vectorized representation of the first object.

16. The system of claim 13, wherein the control circuitry is configured to modify the vectorized representation of the second object to modify vector density.

17. The system of claim 16, wherein the control circuitry is configured to modify the vectorized representation of the second object to modify vector density by inputting the vectorized representation of the second object into a neural network configured to increase vector density.

18. The system of claim 11, wherein the quality attribute is at least one of: a spectral resolution attribute, a temporal resolution attribute, and a coloration attribute.

19. The system of claim 11, wherein the first quality is lower quality and the second quality is high quality.

20. The system of claim 11, wherein the first quality is high quality and the second quality is lower quality.

\* \* \* \* \*